(12) United States Patent
Ishii (10) Patent No.: US 9,198,140 B2
(45) Date of Patent: *Nov. 24, 2015

(54) RADIO BASE STATION AND CONTROL METHOD THEREOF

(71) Applicant: HITACHI KOKUSAI ELECTRIC INC., Tokyo (JP)

(72) Inventor: Takahito Ishii, Tokyo (JP)

(73) Assignee: HITACHI KOKUSAI ELECTRIC INC., Tokyo (JP)

(*) Notice: Subject to any disclaimer, the term of this patent is extended or adjusted under 35 U.S.C. 154(b) by 429 days.

This patent is subject to a terminal disclaimer.

(21) Appl. No.: 13/804,311

(22) Filed: Mar. 14, 2013

(65) Prior Publication Data

US 2013/0194957 A1 Aug. 1, 2013

Related U.S. Application Data

(62) Division of application No. 12/155,403, filed as application No. PCT/JP2006/323310 on Nov. 22, 2006, now Pat. No. 8,417,277.

(30) Foreign Application Priority Data

Dec. 7, 2005 (JP) ................................. 2005-353007

(51) Int. Cl.
| | |
|---|---|
| H04B 7/00 | (2006.01) |
| H04W 52/26 | (2009.01) |
| H04W 52/24 | (2009.01) |
| H04W 52/08 | (2009.01) |
| H04W 52/54 | (2009.01) |
| H04B 1/707 | (2011.01) |
| H04W 52/44 | (2009.01) |

(52) U.S. Cl.
CPC ............ *H04W 52/265* (2013.01); *H04W 52/08* (2013.01); *H04W 52/241* (2013.01); *H04W 52/54* (2013.01); *H04B 1/707* (2013.01); *H04W 52/44* (2013.01)

(58) Field of Classification Search
USPC .......................................................... 455/522
See application file for complete search history.

(56) References Cited

U.S. PATENT DOCUMENTS

| | | | |
|---|---|---|---|
| 6,341,124 B1 * | 1/2002 | Johansson et al. | 370/335 |
| 6,459,884 B1 * | 10/2002 | Amezawa | 455/67.16 |
| 2006/0040697 A1 * | 2/2006 | Komatsu | 455/522 |

FOREIGN PATENT DOCUMENTS

| | | |
|---|---|---|
| JP | 2000-341212 | 12/2000 |
| JP | 2002-300106 | 10/2002 |
| JP | 2004-015354 | 1/2004 |
| JP | 2005-080080 | 3/2005 |
| JP | 2005-136749 | 5/2005 |
| JP | 2005-159495 | 6/2005 |
| JP | 2005-159496 | 6/2005 |

* cited by examiner

*Primary Examiner* — Ankur Jain
(74) *Attorney, Agent, or Firm* — Jacobson Holman, PLLC.

(57) ABSTRACT

To provide a radio base station and a control method thereof wherein a simple way is used to relax the load concentration of a power control and also relax the control delay. A radio base station and a control method thereof wherein a frame generating part inserts a dummy TPC command, and a power setting part sets a TPC command, whereby a process of deciding the TPC command to be inserted can be delayed by the time required for the processes done in the frame generating part, a modulating part and a spreading part and wherein the process of deciding the TPC command and a process of deciding a power value are separated from and done at different timings from a process of controlling a TPC command insertion status and a process of controlling a power setting status, with the result that even when the processes are concentrated, a load dispersion can be done.

20 Claims, 11 Drawing Sheets

CONDITION FOR DETERMINING INSERTION TPC

| INPUT | CONDITION, JUDGMENT | STATE |
|---|---|---|
| COMPRESSED MODE GAP INFORMATION | SLOT CONCERNED IS GAP OR NOT ? | INSERTION STATE/NON-INSERTION STATE |
| SYNCHRONIZATION INFORMATION | DURING FRAME SYNCHRONIZATION OR NOT ? | NORMAL INSERTION STATE/ALTERNATE INSERTION STATE |
| ALTERNATE SYNCHRONIZATION INFORMATION | ALTERNATE VARIATION TIMING OR NOT | INVERTED INSERTION STATE/ENFORCED UP INSERTION STATE |

CONDITION FOR DETERMINING TRANSMISSION POWER

| INPUT | CONDITION, JUDGMENT | STATE |
|---|---|---|
| COMPRESSED MODE GAP INFORMATION | WHETHER SLOT CONCERNED IS GAP OR NOT ? | TRANSMISSION ON/OFF |
| SYNCHRONIZATION INFORMATION | DURING FRAME SYNCHRONIZATION OR NOT ? | POWER CONTROL LOOP STATE/NON-LOOP STATE |
| INITIAL SYNCHRONIZATION INFORMATION | BEFORE INITIAL SYNCHRONIZATION ESTABLISHED OR NOT ? | POWER INCREASING OPERATION STATE/POWER MAINTAINING OPERATION STATE |
| POWER INCREASING OPERATION CONTROL PERIOD POWER INCREASING OPERATION CONTROL FREQUENCY | WHETHER POWER INCREASING OPERATION IS BEING CONTINUED ? | POWER INCREASING OPERATION STATE/SYNCHRONIZATION WAITING STATE |
| POWER INCREASING OPERATION CONTROL PERIOD | POWER INCREASING TIMING OR NOT ? | POWER INCREASING STATE/POWER MAINTAINING STATE |
| Down Link RECOVERY POWER PERIOD (DLRPP) INFORMATION | DLRPP SECTION OR NOT ? | ±1dB CONTROL STATE/±dB CONTROL STATE |

RADIO BASE STATION AND CONTROL METHOD THEREOF

BACKGROUND OF THE INVENTION

1. Field of the Invention

The present invention relates to a radio base station for performing radio communication with a mobile terminal, and particularly to a radio base station for performing so-called transmission power control of inserting a power control (TPC: Transmitter Power Control) command into transmission data so that reception quality of signals from a mobile terminal is constant, and also adjusting transmission power by a TPC command from the mobile terminal, and a control method thereof.

2. Description of the Related Art

Figure 8:
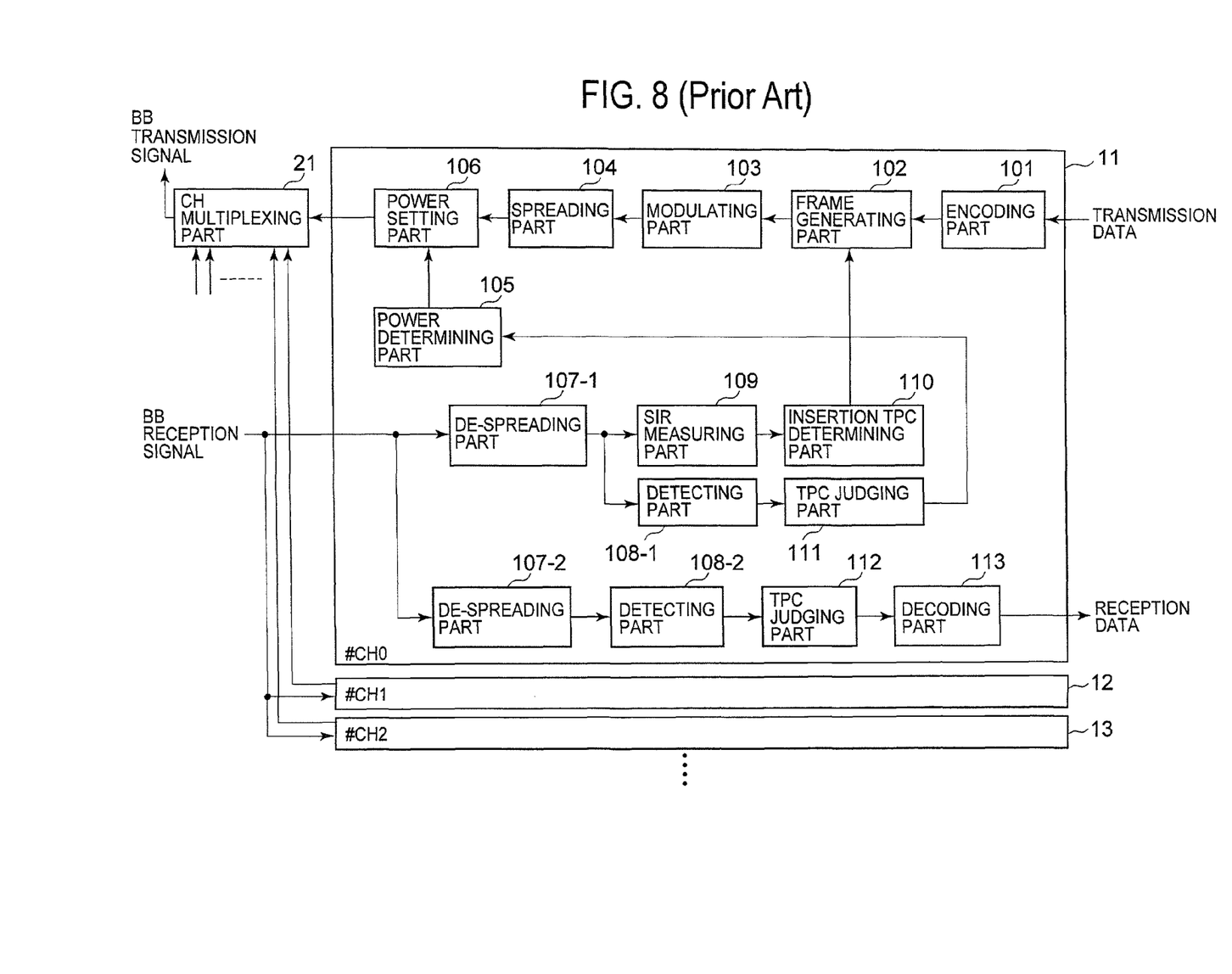
FIG. 8 is a block diagram showing the construction of a conventional radio base station.

The construction of a radio base station for performing transmission power control using a prior art will be described with reference to FIG. 8 by exemplifying a W-CDMA (Wide Band-Code Division Multiple Access) system. FIG. 8 is a block diagram showing the construction of a conventional radio base station.

As shown in FIG. 8, the conventional radio base station is equipped with base band transmitting/receiving parts 11, 12, 13, . . . for performing base band transmission/reception of each call under the control of a base station, and a channel (CH) multiplexing part 21 for multiplexing channels and outputting a base band (BB) transmission signal.

The base band transmitting/receiving part 11 takes charge of a channel zero (#CH0), the base band transmitting/receiving part 12 takes charge of a channel 1 (#CH1), and the base band transmitting/receiving part 13 takes charge of a channel 2 (#CH2).

Each base band transmitting part comprises an encoding part 101 for encoding transmission data, a frame generating part 102 for inserting a pilot symbol for synchronous detection and a TPC command into the encoded transmission data, a modulating part 103 for performing primary modulation such as QPSK (Quadrature Phase Shift Keying), 16QAM (16-positions Quadrature Amplitude Modulation) or the like, a spreading part 104 for performing spreading modulation by using a spreading code of each call, a power control part 105 for determining a power value of each call, a power setting part 106 for multiplying the spread signal of each call by the power value determined in the power control part 105, de-spreading parts 107-1, 107-2 for performing de-spreading from a reception signal by using a reference code of each call and extracting the reception signal of the call, detecting parts 108-1, 108-2 for subjecting the extracted reception signal of each call to synchronous detection, an SIR measuring part 109 for measuring reception quality (SIR: Signal to Interference Ration: the ratio of desired wave power to interfering wave power) of the extracted reception signal of each call, an insertion TPC generating part 110 for determining an insertion TPC command from the measured SIR, a TPC judging part 111 for judging the TPC command out of the synchronously-detected reception signal, a data judging part 112 for judging transmission data out of the synchronously-detected reception signal, and a decoding part 113 for decoding the judged transmission data.

Furthermore, the CH multiplexing part 21 is a site for adding and multiplexing transmission-processed data of each call.

The operation of the conventional radio base station shown in FIG. 8, particularly, the operation associated with the transmission power control will be described.

First, the transmission data encoded in the encoding part 101 is input to the frame generating part 102. In the frame generating part 102, the synchronous detection pilot system and the TPC command are inserted into the transmission data.

Figure 9:
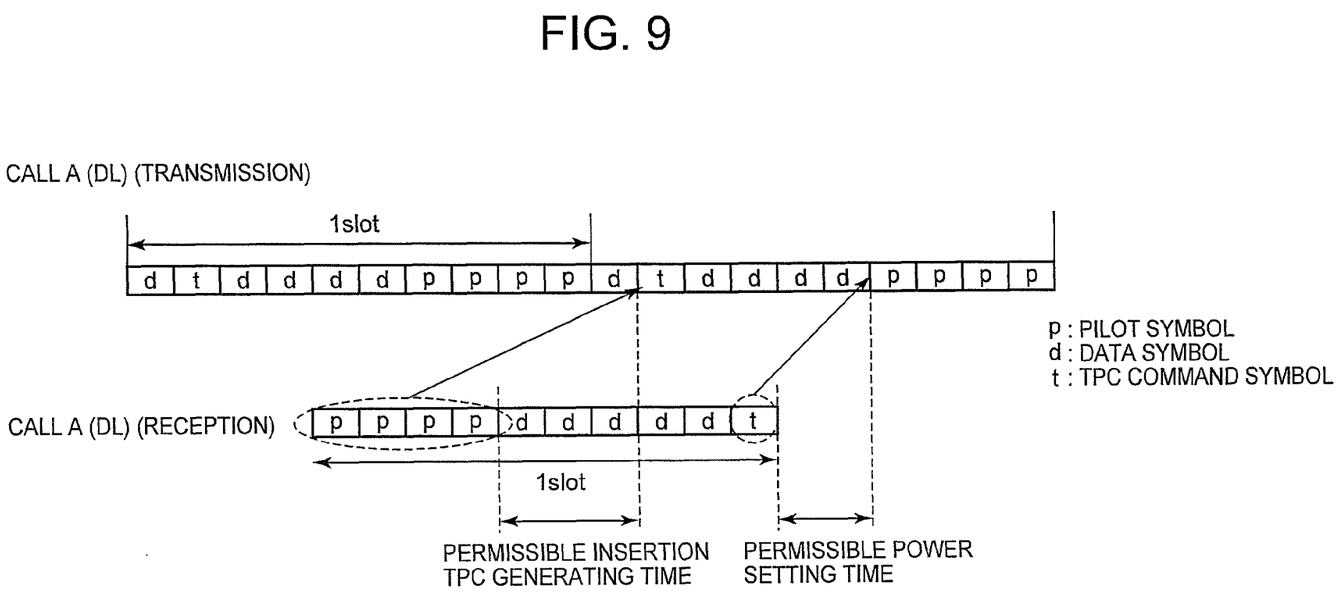
FIG. 9 is a diagram showing a frame construction example of a downlink (DL) and an uplink (UL).

As shown in FIG. 9, the pilot symbol and the TPC command are inserted at a period of one slot (slot) of the transmission signal. FIG. 9 is a diagram showing an example of the frame construction of a downlink (Downlink: DL) and an uplink (Uplink: UL). In FIG. 9, p represents a pilot symbol, d represents a data symbol and t represents a TPC command.

With respect to the pilot symbol, a unique symbol for which a slot number allocated on the basis of the system timing of the call concerned has been already known at both the base station and the terminal is inserted.

With respect to the TPC command, for example, SIR is measured from the received pilot symbol of a call A (UL) of FIG. 9, and the insertion TPC command is determined and generated in accordance with the measurement result in the insertion TPC generating part 110. In general, a reference SIR and the measured SIR of the call concerned are compared with each other, and the following commands are generated:

in case of measured SIR>reference SIR, DOWN command, or in case of measured SIR<reference SIR, UP command.

The generated insertion TPC command is inserted into the next one slot of the transmission signal of the call A (DL) in the frame generating part 102, and the framed transmission data are modulated in the modulating part 103, spread in the spreading part 104, and input to the power setting part 106.

The received BB signal is de-spread in the de-spreading parts 107-1, 107-2 by the reference code of the call concerned, and subjected to the synchronous detection in the detection parts 108-1, 108-2. With respect to the TPC command, the judgment of the TPC command symbol is made in the TPC judging part 111, and with respect to the data symbol, the judgment of data is made in the data judging part 112.

The data judged in the data judging part 112 are decoded in the decoding part 113, whereby reception data can be obtained.

Furthermore, the TPC command judged in the TPC judging part 111 generally has "power UP", "power DOWN" information, and on the basis of a judgment result in the TPC judging part 111, the power control part 105 determines power of +1 dB for the present power value in case of "power UP" and −1 dB in case of "power DOWN".

The determined power value is reflected at a timing as shown in FIG. 9, multiplied by the transmission data in the power setting part 106 and then output. The transmission data which are bit-expanded by the power value of each call are multiplied in the CH multiplexing part 21 and output.

JP-A-2005-159495 "TRANSMISSION POWER CONTROL METHOD" (see Patent Document 1) is known as a prior art concerning transmission power control in DS-CDMA (Direct Sequence Code Division Multiple Access) assuming that so-called transmission power control of adjusting transmission power from a counter station so that reception quality from the counter station is constant is carried out at some transmission/reception station.

Patent Document 1: JP-A-2005-159496

The above operation is carried out for plural calls in the radio base station. In this case, there is the following problem.

Figure 10:
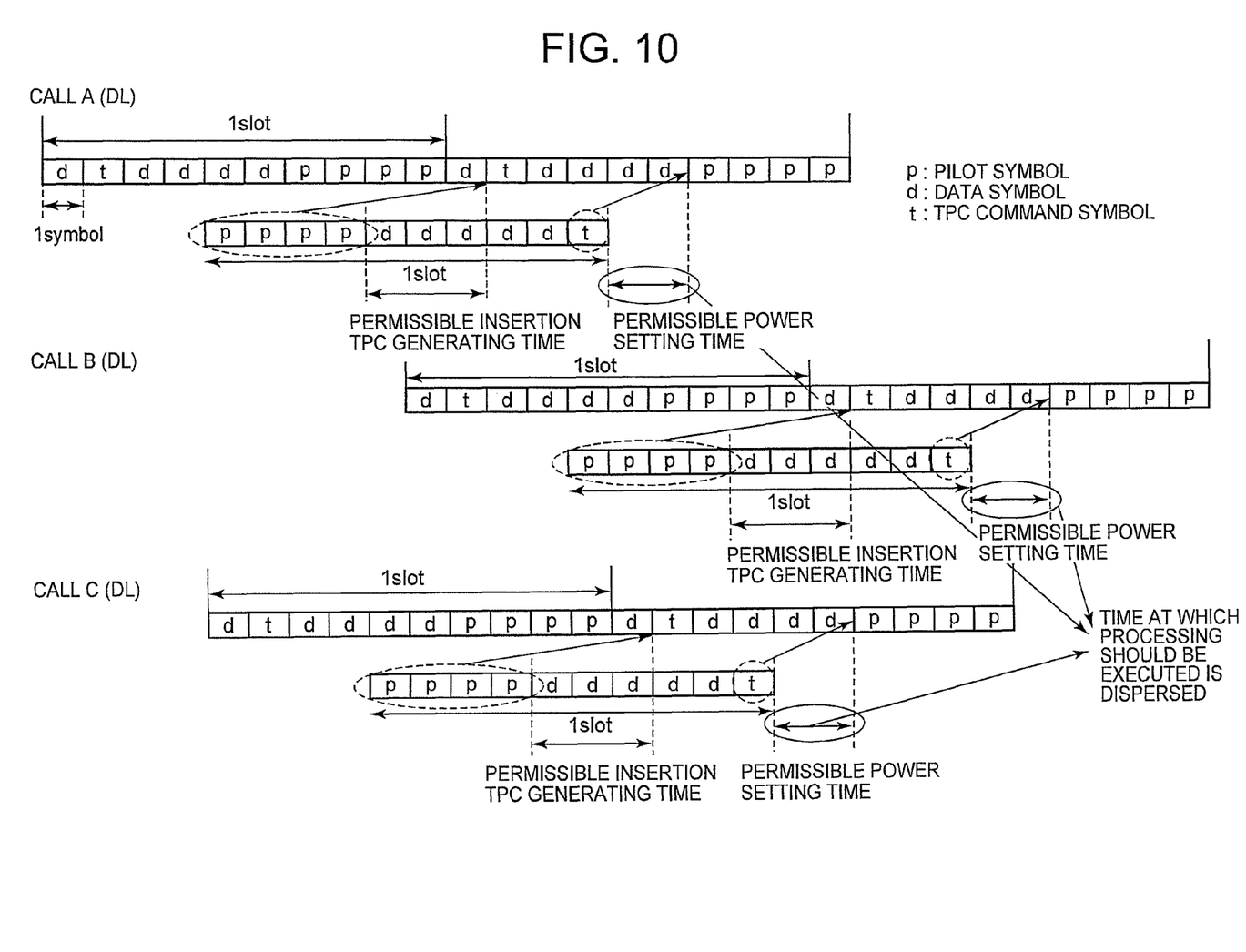
FIG. 10 is a schematic diagram showing the frame construction when a frame boundary of each call has an offset to a system timing relatively.

The problem will be described with reference to FIGS. 10 and 11. FIG. 10 is a schematic diagram showing the frame construction when a frame boundary of each call has an offset to a system timing relatively, and FIG. 11 is a schematic diagram showing the frame construction when the frame boundary of each call is coincident with the system timing.

In the case shown in FIG. 10, the permissible power setting time and the insertion TPC generating time of each call likewise has an offset to the system timing, and in other words, it equivalently means that the processing load of each call which is effective to the permissible time is dispersed.

Figure 11:
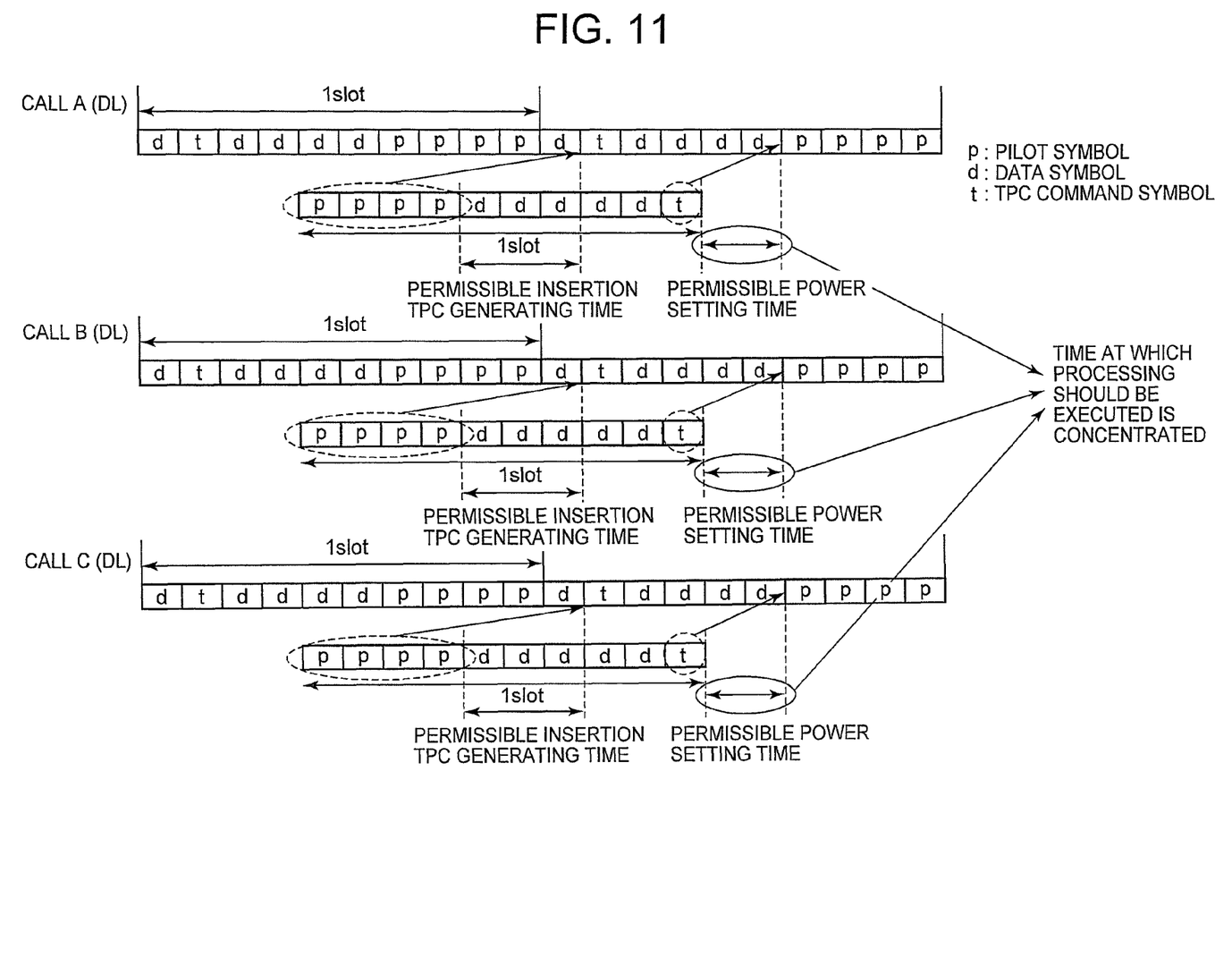
FIG. 11 is a schematic diagram showing the frame construction when the frame boundary of each call is coincident with the system timing.

On the other hand, in the case of FIG. 11, the permissible power setting time and the insertion TPC generating time of each call are completely coincident, and thus this equivalently means that the effective processing time of each call to the permissible time is required to be short, that is, the load is concentrated.

When the system permits this condition, high-speed processing must be executed so as to adapt to the load concentration. For example, when it is assumed that the above processing is executed by using a signal processing processor, it is considered that a high-speed processor which can also adapt to the load concentration is used.

However, there is a problem that a higher speed processor is more expensive.

Furthermore, as the processing construction of the above processing, when the processing is executed under the condition that the processing amount per unit time is determined, for example, there are two calls during one symbol time, there occurs a problem that the permissible time can be kept for some call, but the permissible time cannot be kept for another call. When the permissible time cannot be kept, parasitic oscillation caused by so-called power control delay occurs, and the reception quality is deteriorated at both the base station side and the terminal side.

The insertion TPC processing of FIG. 8 is executed in the frame generating part 102, and the modulation processing in the modulating part 103, the spreading processing in the spreading part 104 and the power setting processing in the power setting part 106 are sequentially executed subsequently to the frame generating processing.

That is, with respect to the timing at which the TPC command is inserted, in consideration of the processing time of the modulation, the spreading, the power setting, etc., this processing is required to be executed much earlier. This effectively means that the permissible insertion TPC generating time of FIG. 9 is further shorter, and thus the above problem when the load is concentrated is estimated to be more serious.

SUMMARY OF THE INVENTION

The present invention has been implemented in view of the foregoing situation, and has an object to provide a radio base station for relaxing load concentration of power control by a simply method and also relaxing control delay, and a control method thereof.

In order to solve the problem of the above prior art, according to the present invention, a radio base station that inserts a power control command into transmission data so that reception quality of signals from a mobile terminal is constant and adjusts transmission power on the basis of the power control command in reception data from the mobile terminal comprises: a quality measuring part for measuring the quality of a reception signal; a power control command insertion status control part for controlling a condition for determining a power control command to be inserted into transmission data; a power control command determining part for determining the power control command to be inserted on the basis of the measured quality of the reception signal and the condition for determining the power control command; a detecting/judging part for synchronously detecting and judging the power control command from the reception data; a power setting status controller for controlling a condition for determining transmission power for a call; a power determining part for determining a transmission power value for the call concerned on the basis of the judged power control command and the condition for determining the transmission power; a frame generating part for inserting a pilot symbol for synchronous detection and a dummy power control command into encoded transmission data to generate a frame; a modulating part for subjecting the frame-generated transmission data to primary modulation; a spreading part for performing spreading modulation by using a spreading code of each call; and a power setting part for multiplying the transmission power value determined in the power determining part by a signal which is subjected to spreading modulation every call. Therefore, the processing in the power control command determining part to which real-time performance is required can be delayed by the amount corresponding to the processing time of the frame generating part, the modulating part and the spreading part by setting the power control command in the power setting part, and even when the processing to which real-time performance is required is concentrated, the load can be dispersed.

Furthermore, according to the present invention, in the radio base station, the power setting part has a function of inverting the sign of the transmission power value in accordance with the inserted power control (TPC) command when the transmission data are the timing at the power control (TPC) command to be timely inserted.

According to the present invention, in the radio base station, the determination of the power control command in the power control command determining part and the determination of the transmission power value in the power determining part are carried out at the timing of each call, and the control processing in the power control command insertion status control part and the control processing in the power setting status control part are executed on all calls under the control of the base station collectively or while the number of calls to be processed per unit time is determined.

According to the present invention, a method of controlling a radio base station that inserts a power control command into transmission data so that reception quality of signals from a mobile terminal is constant, and adjusts transmission power on the basis of the power control command in reception data from the mobile terminal comprises: inserting a fixed symbol serving as a power control command as a dummy irrespective of the quality of a reception signal measured in a quality measuring part, generating timing information for identifying a symbol in which the power control command as the dummy is inserted and outputting the timing information to the power setting part by a frame generating part; modulating framed transmission data by a modulating part; spreading the transmission data in a spreading part; and setting the power control command corresponding to the quality of the reception signal measured in the quality measuring part on the basis of the timing information and subjecting the spread transmission data to power setting by a power setting part. Accordingly, the processing in the power control command determining part to which real-time performance is required can be delayed by the amount corresponding to the processing time of the frame generating part, the modulating part and the spreading part by setting the power control command in the power setting part, and even when the processing to which real-time performance is required is concentrated, the load can be dispersed.

According to the present invention, in the radio base station control method, the power determining part determines a transmission power value, and the power setting part inverts the sign of the transmission power value in accordance with the power control command.

According to the present invention, in the radio base station control method, the power control command determining part executes the processing of determining the power control command corresponding to the quality of the reception signal measured in the quality measuring part at the timing of each call, the power determining part executes the processing of determining the transmission power value at the timing of each call, the power control command insertion status control part executes the control processing on all the calls under the control of the base station collectively or while the number of calls to be processed per unit time is determined, and the power setting status control part executes the control processing on all the calls under the control of the base station collectively or while the number of calls to be processed per unit time is determined. Accordingly, the processing in the power control command determining part and the processing in the power determining part to which real-time performance is required, and the control processing of the power control command insertion status control part and the control processing of the power setting status control part to which real-time performance is not required can be separately executed at different timings, and the load concentration of the processing to which real-time performance is required can be reduced.

DESCRIPTION OF REFERENCE NUMERALS 11, 12, 13, 51, 53 . . . base band transmitting/receiving part, 101, 501 . . . encoding part, 102, 502 . . . frame generating part, 103, 503 . . . modulating part, 104, 504 . . . spreading part, 105 . . . power control part, 106 . . . power setting part, 107-1, 107-2 . . . de-spreading part, 507-1, 507-2, de-spreading part, 108-1, 108-2 . . . detecting part, 508-1, 508-2 . . . detecting part, 109, 509 . . . SIR measuring part, 110 . . . insertion TPC generating part, 510 . . . insertion TPC determining part, 111, 511 . . . TPC judging part, 112, 512 . . . data judging part, 113, 513 . . . decoding part, 21, 61 . . . CH multiplexing part, 71 . . . power setting status control part, 81 . . . TPC insertion status control part

DESCRIPTION OF THE PREFERRED EMBODIMENT

An embodiment according to the present invention will be described with reference to the drawings.

In a radio base station and a control method of the radio base station according to this embodiment of the present invention, a TPC command as a dummy is inserted in a frame generating part, and setting of the TPC command is carried out in a power setting part. Therefore, the processing of determining a TPC command to be inserted can be delayed by the amount corresponding to the processing time of the frame generating part, a modulating part and the spreading part, and thus even when the processing is concentrated, the load can be dispersed.

Furthermore, in the radio base station of this embodiment of the present invention, the processing of determining the TPC command and the processing of determining the power value to which real-time performance is required, and the control processing of the TPC command insertion status and the power setting status control processing to which no real-time performance is required are executed separately from each other at different timings, so that the concentration of the load imposed on the processing to which the real-time performance is required can be reduced.

Figure 1:
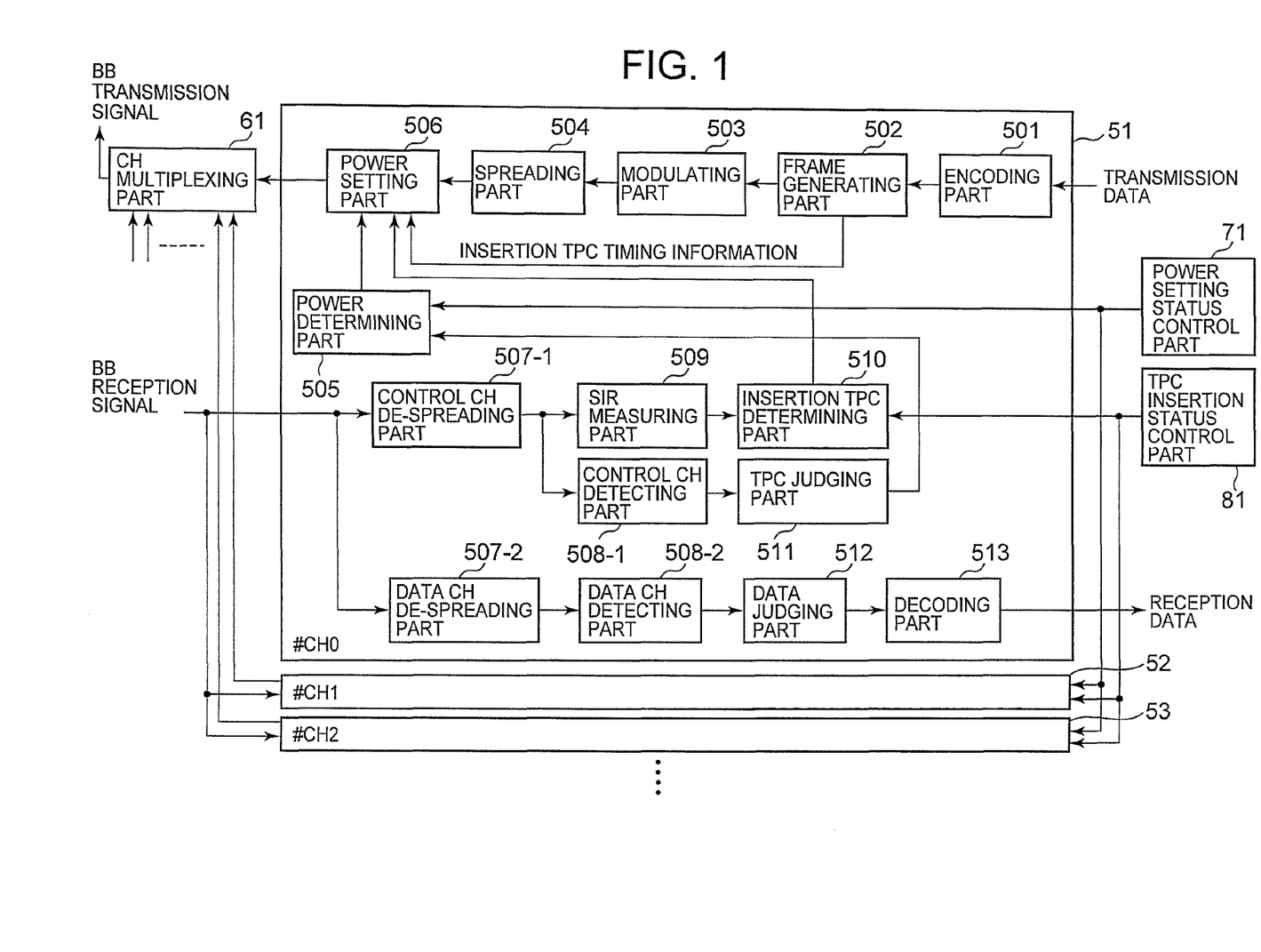
FIG. 1 is a block diagram showing the construction of a radio base station according to an embodiment of the present invention.

The construction of the radio base station according to the embodiment of the present invention will be described with reference to FIG. 1. FIG. 1 is a block diagram showing the construction of the radio base station according to the embodiment of the present invention.

As shown in FIG. 1, the radio base station (this base station) of the embodiment of the present invention has base band transmitting/receiving parts 51, 52, 53, . . . for performing base band transmission/reception of each call under the control of the base station, a channel (CH) multiplexing part 61 for multiplexing channels and outputting a base band (BB) transmission signal, a power setting status control part 71 for controlling a condition for determining transmission power, and a TPC insertion status control part 81 for controlling a condition for determining an insertion TPC command.

The base band transmission/reception part 51 takes charge of a channel zero (#CH0), the base band transmitting/receiving part 52 takes charge of a channel 1 (#CH1) and the base band transmitting/receiving part 53 takes charge of a channel 2 (#CH2).

Each base band transmitting/receiving part comprises an encoding part 501 for encoding transmission data, a frame generating part 502 for inserting a pilot symbol for synchronous detection and a TPC command as a dummy into the encoded transmission data, a modulating part 503 for performing primary modulation such as QPSK, 16QAM or the like, a spreading part 504 for performing spreading modulation by using a spreading code of each call, a power determining part 505 for determining a power value of each call and outputting the power value, a power setting part 506 for multiplying the spreading signal of each call by the power value determined in the power determining part 505, de-spreading parts 507-1, 507-2 for performing de-spreading from the reception signal by using a reference code of each call to extract the reception signal of the call, detecting parts 508-1, 508-2 for subjecting the extracted reception signal of each call to synchronous detection, an SIR measuring part 509 for measuring reception quality (SIR) of the extracted reception signal of each call, an insertion TPC generating part 510 for determining an insertion TPC command from the measured SIR, a TPC judging part 511 for making a judgment concerning the TPC command out of the synchronously detected reception signal, a data judging part 512 for making a judgment concerning transmission data out of the synchronously detected reception signal, and a decoding part 513 for decoding the judged transmission data.

The CH multiplexing part 61 is a site for adding and multiplexing data of each call which has been subjected to the transmission processing. The power setting status control part 71 is a site for controlling a condition for determining transmission power for a call under the control of the radio base station.

The TPC insertion status control part 81 is a site for controlling a condition for determining a TPC command to be inserted for a call under the control of the radio base station.

Next, the operation in the base station will be described with reference to FIG. 1.

The transmission data encoded in the encoding part 501 are input to the frame generating part 502.

In the frame generating part 502, a pilot symbol for synchronous detection and a dummy TPC command are inserted into the transmission data. The pilot symbol and the TPC command are inserted at one slot period of transmission signal as in the case of the prior art. A unique symbol for which a slot number allocated on the basis of the system timing of the call concerned has been already known in both the base station and the terminal is inserted as the pilot symbol.

In the embodiment of this invention, with respect to the TPC command inserted in the frame generating part 502, a fixed symbol is inserted as a dummy irrespective of the measured SIR. Furthermore, the frame generating part 502 generates insertion TPC timing information so that a dummy TPC-command inserted symbol can be identified, and outputs the insertion TPC timing information to the power setting part 506. The framed transmission data are modulated in the modulating part 503, subjected to spreading in the spreading part 504 and then input to the power setting part 506.

In the power setting part 506, the setting of power and the insertion of the TPC command are performed.

Figure 2:
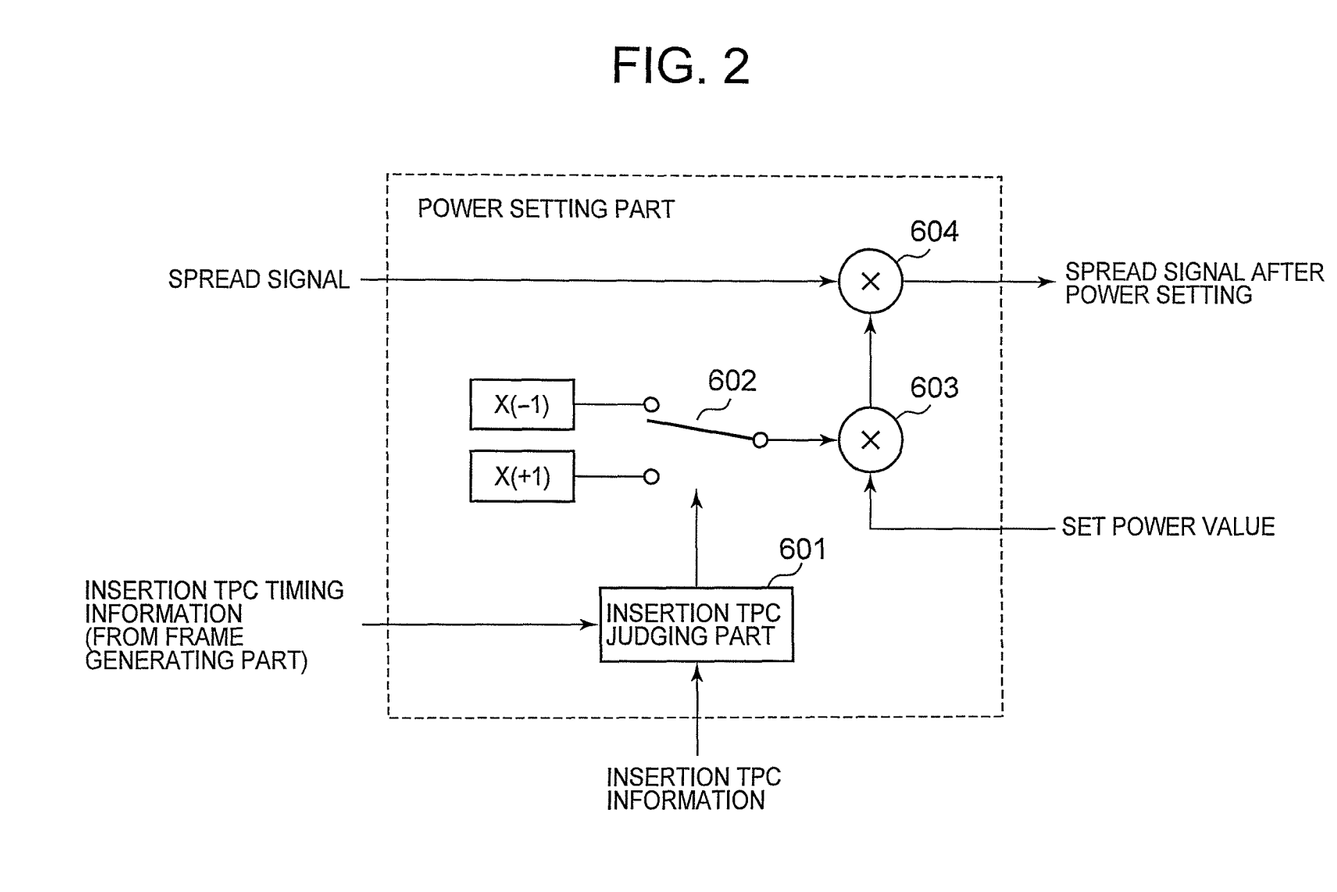
FIG. 2 is a block diagram showing the construction of a power setting part.

Here, the method of inserting the TPC command in the power setting part 506 will be described with reference to FIG. 2. FIG. 2 is a block diagram showing the construction of the poser setting part.

In FIG. 2, an insertion TPC judging part 601 judges whether the TPC information to be inserted (insertion TPC information) which corresponds to an output from the insertion TPC determining part 510 is "power UP instruction" or "power DOWN instruction".

A switch part 602 performs a switching operation between the output "−1" if the judged insertion TPC information indicates "power DOWN instruction" and the output "+1" if the judged insertion TPC information indicates "power UP instruction".

A multiplier 603 multiplies the power setting value corresponding to the output of the power determining part 505 by the output of the switch part 602 to allocate a sign to the power setting value.

The multiplying part 604 multiplies the "+" or "−" sign allocated power setting value by the spread signal from the spreading part 504, and outputs the spread signal after the power setting.

Figure 3:
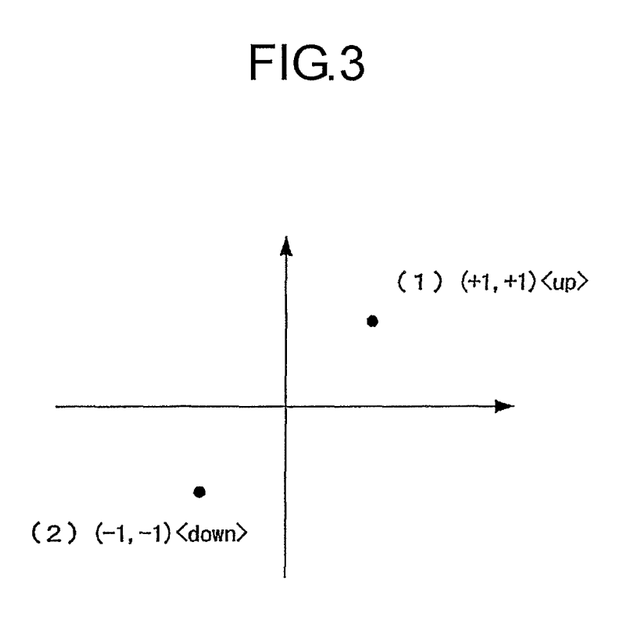
FIG. 3 is a diagram showing an example of TPC command symbol mapping in QPSK modulation.

As described above, the TPC command symbol inserted in the frame generating part 502 is a dummy, and it is a fixed symbol. If QPSK is assumed as primary modulation and an example as shown in FIG. 3 is assumed, the TPC symbol may take any one of (1) and (2). FIG. 3 is a diagram showing an example of the TPC command symbol mapping in QPSK modulation.

The insertion TPC timing information is input from the frame generating part 502, the switch 602 is operated on the basis of the insertion TPC command judgment result when the TPC insertion timing comes, the sign is allocated to the power setting value in the multiplier 603, +(power setting value) or −(power setting value) is output.

If the TPC command to be inserted as a dummy is assumed to be an UP command ((1) of FIG. 3), the insertion TPC command is inverted by the multiplication of the multiplier 604 to be a phase point of (2) of FIG. 3 when the value of the output of the multiplier 603 is equal to −(power setting value).

Conversely, when the value of the output of the multiplier 603 is equal to +(power setting value), the insertion TPC command is kept to the phase point of (1) of FIG. 3 even after the multiplication of the multiplier 604.

In the base station, the insertion TPC timing can be delayed more effectively than the prior art.

The received BB signal is de-spread by using the reference code for the cal concerned in the de-spreading parts 507-1, 507-2, and subjected to synchronous detection in the synchronous detection parts 508-1, 508-2. The TPC command symbol is judged in the TPC judging part 511, and the data symbol is judged in the data judging part 512. The data judged in the data judging part 512 is decoded in the decoding part 513 to obtain the reception data.

Here, transmission power control mans in the base station will be described with reference to FIGS. 4 to 7.

Figure 4:
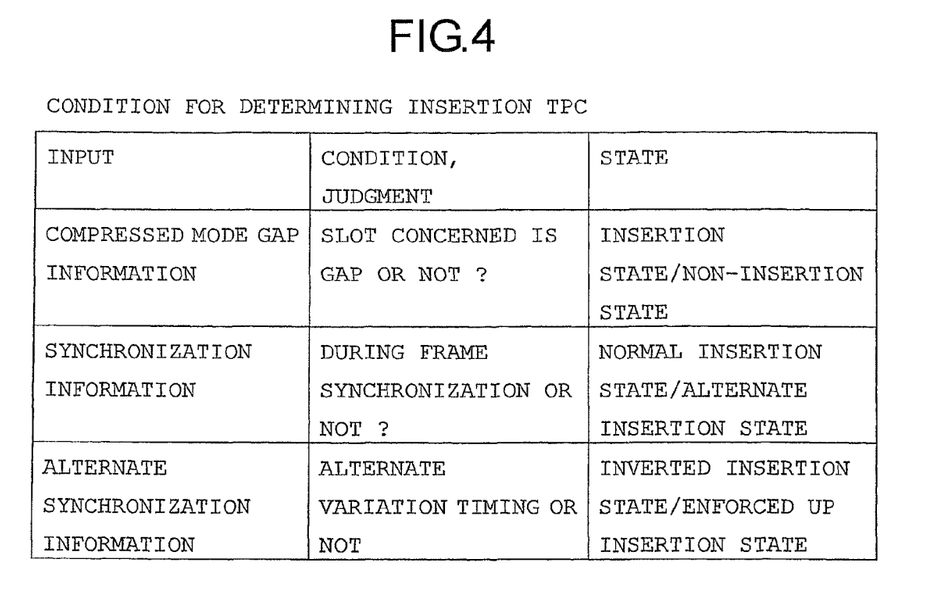
FIG. 4 is a diagram showing a condition content for determining transmission power.
Figure 5:
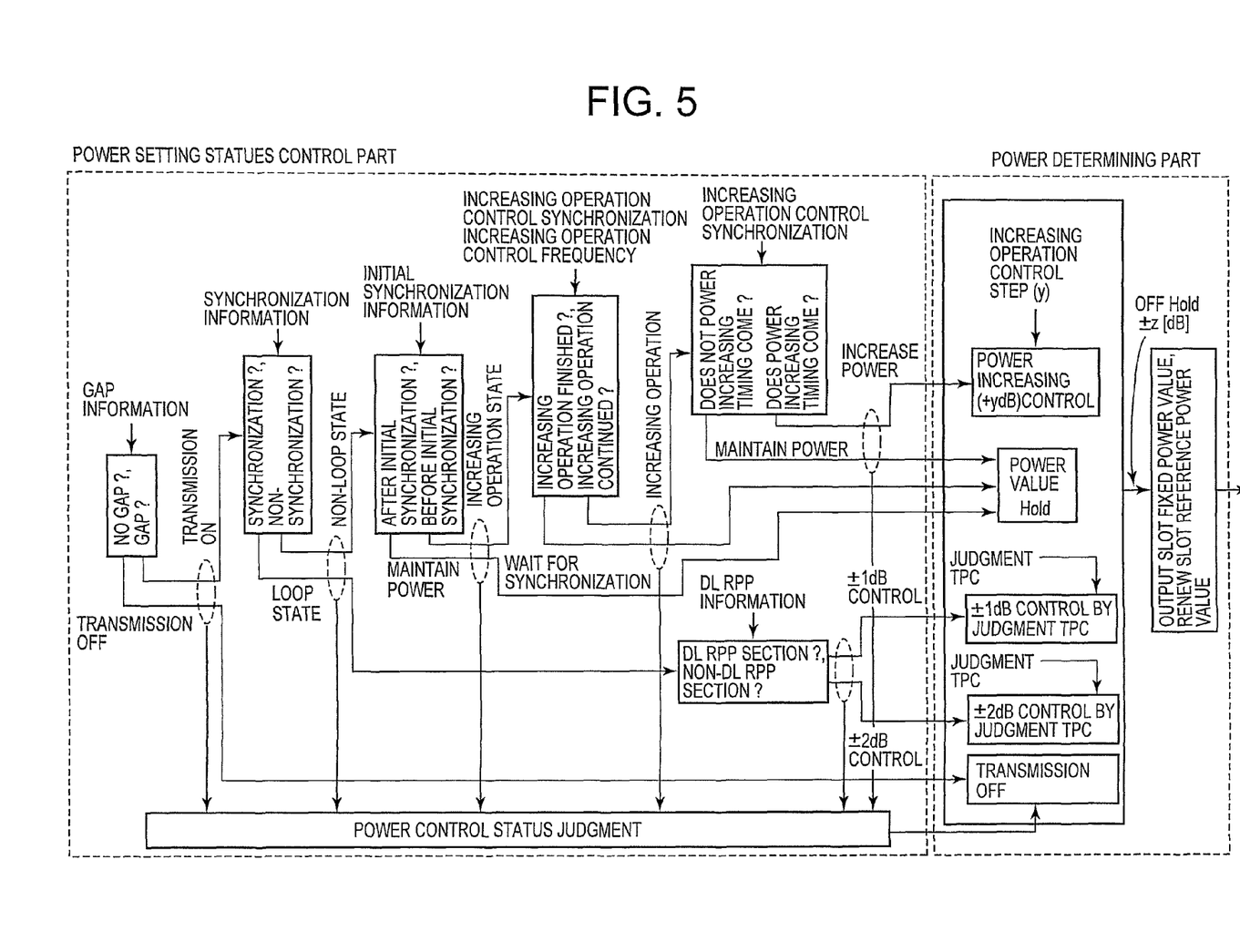
FIG. 5 is a diagram showing a processing example of a power setting status control part and a power determining part.
Figure 6:
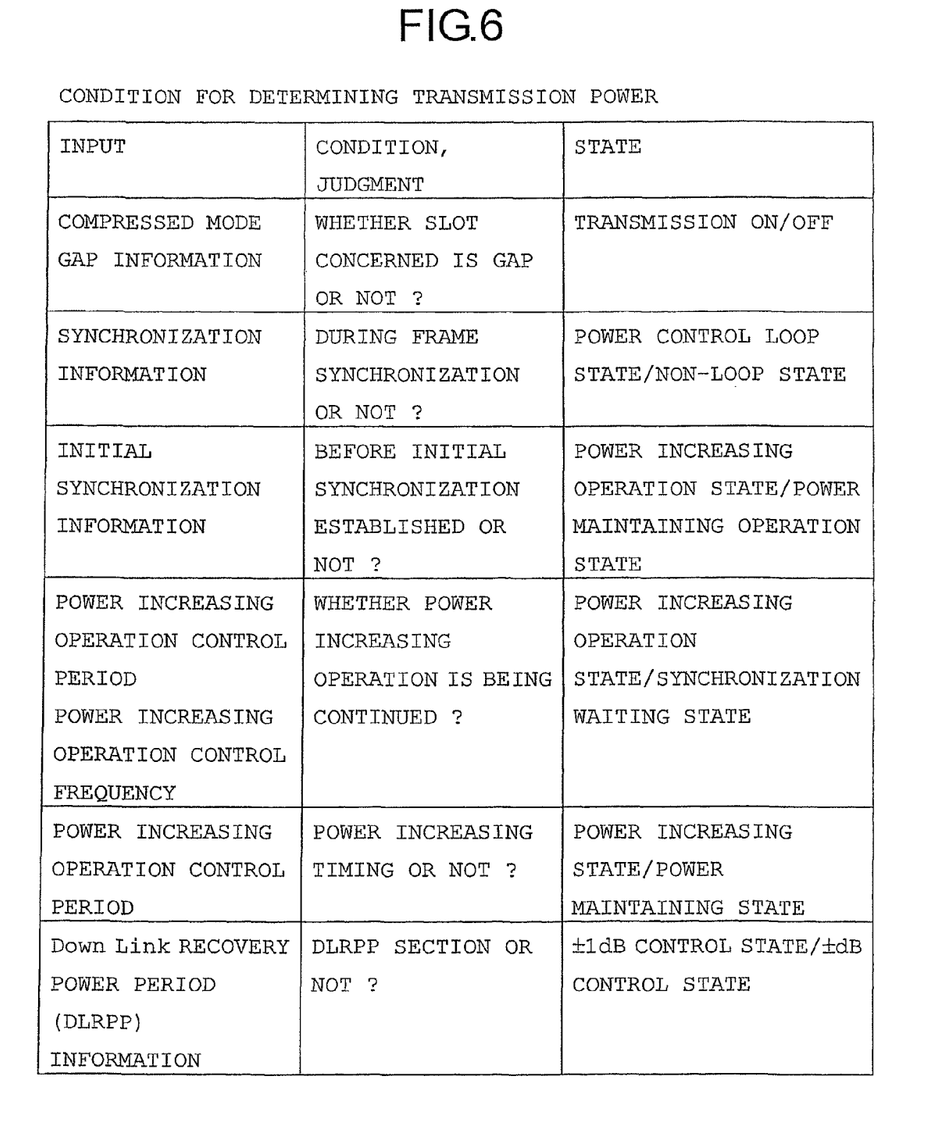
FIG. 6 is a diagram showing a condition content to determine insertion TPC.
Figure 7:
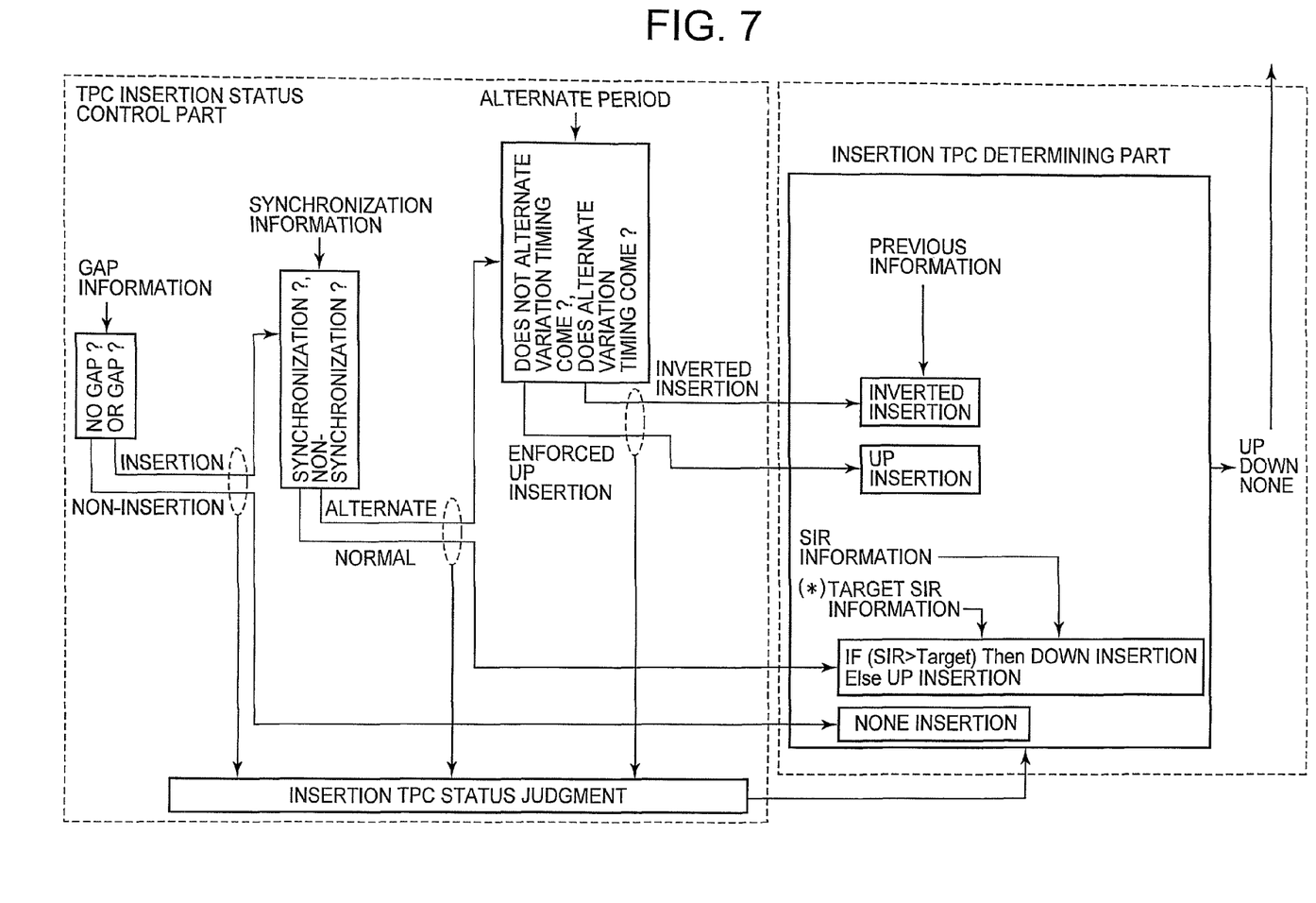
FIG. 7 is a diagram showing a processing example of a TPC insertion status control part and an insertion TPC determining part.

FIG. 4 is a diagram showing a condition content for determining transmission power, FIG. 5 is a diagram showing processing examples of the power setting status control part and the power determining part, FIG. 6 is a diagram showing a condition content for determining the insertion TPC, and FIG. 7 is a diagram showing processing examples of the TPC insertion status control part and the insertion TPC determining part.

As the condition for determining the transmission power shown in FIG. 4, the power setting status control part 71 "judges" the "condition" to an "input", and when the "judgment" result is output to the power determining part 505, it controls to establish the "state" based on the "judgment" result.

That is, when the information indicated in an "input" column or the like is input to the power setting status control part 71, a judgment concerning the condition corresponding to the information as shown in a "condition, judgment" column, and the state is controlled in the power determining part 505 on the basis of the judgment result to the condition as shown in a "status" column.

The power setting status control part 71 judges the priority of each state or whether the state is achievable or unachievable on the system, selects any one of the statuses of enforced power increase control, power value hold (keep) control, ±1 dB control based on the judgment TPC, ±2 dB control based on the judgment TPC, transmission OFF and outputs it as a power setting status as shown in FIG. 5.

The operation is carried out on the basis of the power setting status in the power determining part 505.

For example, when the ±1 dB control status based on the judgment TPC is indicated, the calculation and determining processing of the power setting value in the call concerned is carried out at the timing of the call concerned by using the judgment TPC and the reference power value to determine and renew the present power setting value.

As described with respect to the above example, the processing (control) concerning the determination of the power value is separated into the processing in the power determining part 505, etc. to which real-time performance is truly required as a portion at which the processing is not executed unless the result of the judgment TPC has been known, and the processing in the power setting status control part 71 as a portion to which real-time performance is not required because it has been known in advance.

As the condition for determining the insertion TPC shown in FIG. 6, the TPC insertion status control part 81 "judges" a "condition" to an "input" in, and when the "judgment" result is output to the insertion TPC determining part 510, it controls the insertion TPC determining part 510 to establish the "state" based on the "judgment".

FIG. 7 shows the processing when the insertion TPC is determined, and FIG. 7 shows an example of the condition for determining the insertion TPC in W-CDMA.

On the basis of the input of FIG. 6, the TPC insertion status control part 81 makes a judgment concerning the condition in FIG. 6, and settles each state. It judges the priority of each state or whether the state is achievable or unachievable, and selects any one of statuses of insertion of the inverted output to the previous output, insertion of an enforced UP command, insertion of the comparison result between Target SIR and the measured SIR measurement result and non-insertion, and outputs it as a TPC insertion status as shown in FIG. 7.

The operation is carried out on the basis of the TPC insertion status in the insertion TPC determining part 510.

For example, when the comparison result between the Target SIR and the SIR measurement result indicates the insertion status, the calculation and determining processing of the insertion TPC in the call concerned is carried out at the timing of the call concerned by using the measured SIR and the Target SIR to determine and renew the insertion TPC.

As described with respect to the above example, as in the case of the power setting processing, with respect to the processing of the insertion TPC, the processing (control) concerning the determination of the insertion TPC is separated into the processing in the insertion TPC determining part 510, etc. to which real-time performance is truly required as a portion at which the processing is not executed unless the measurement result of SIR has been known, and the processing in the TPC insertion status control part 81 as a portion to which real-time performance is not required because it has been known in advance.

The transmission power control processing for plural calls when the processing is separated into the processing (control) to which the real-time performance is truly required, and the processing (control) to which the real-time performance is not truly required because it has been known in advance, will be described.

By utilizing the fact that the power setting status control processing and the TPC insertion status control processing to which the real-time performance is not truly required have been known in advance, for example, the processing can be collectively executed on the plural calls in accordance with the load status of a processor in advance, and the load can be dispersed by uniquely determining the number of calls to be processed per unit time. As a result, this contributes to reduce the concentration degree of the processing to which the real-time performance is truly required, and the problem that the permissible-time regulation-unreachable problem due to the load concentration is relaxed.

As described above in detail, by the construction of the base station and the transmission power control procedure, the load of the power control processing can be dispersed, and also the effective permissible time for the generation of the insertion TPC can be increased.

The present invention is suitably used for a radio base station for relaxing load concentration of power control and relaxing control delay by a simple method, and a method of controlling the radio base station.

What is claimed is:

1. A base band transmitter/receiver in a radio base station that transmits transmission data including a first power control command so that reception quality of signals from a mobile terminal is constant and adjusts transmission power on a basis of a second power control command in reception data from the mobile terminal, the radio base station configured for:

measuring the quality of a reception signal;

settling a state judged from a plurality of states corresponding to a plurality of first conditions which determines the first power control command to be inserted into transmission data, and for determining the first power control command on a basis of the measured quality of the reception signal and the state for settling;

detecting and judging the second power control command from the reception data;

settling a state judged from a plurality of states corresponding to a plurality of second conditions which determines the transmission power for a call, and for determining a transmission power value for the call concerned on a basis of the judged second power control command and the state for settling;

primary modulating a frame generated by inserting a pilot symbol for synchronous detection and a dummy power control command into the transmission data for one slot period;

subjecting the primary modulated frame to secondary modulation by using a code of each call for multiplexing; and inputting a timing information of the symbol where the dummy power control command is inserted to and the transmission data in the secondary modulated frame being modulated, for multiplying the transmission data by the determined transmission power value, for inverting the symbol on a basis of the determined first power control command at a timing of the dummy power control command indicated by the timing information, and for outputting the inverted symbol in real time.

2. The base band transmitter/receiver according to claim 1, wherein the determination of the power control command and the determination of the transmission power value are carried out at a timing of each call, the generated frame is synchronized on all calls under the control of the base station, and the inverting symbol processing is carried out at the same timing for all calls.

3. The base band transmitter/receiver according to claim 1, wherein the first power control command is a binary information which indicates "up" or "down", is mapped either one of two symbols located origin symmetrically in QPSK modulation, and inverting the symbol by inverting the sign of the transmission power value which is multiplied by the transmission data at a timing of the dummy power control command.

4. The base band transmitter/receiver according to claim 1, wherein the plurality of the first conditions includes at least conditions relating to a frame synchronization and alternate variation timing, as the plurality of states corresponding to the plurality of the second conditions, the radio base station settles a state which determines ordinarily the first power control command on the basis of the measured quality of the reception signal when the condition is frame synchronizing, and settles a state for inverting the first power control command in previous information or settles a state for determining the power control command as "up" corresponding to the condition of the alternate variation timing when the condition is not frame synchronizing.

5. The base band transmitter/receiver according to claim 1, wherein the plurality of the second conditions includes at least conditions relating to compressed mode GAP, RPP section and power amplification, as the plurality of states corresponding to the plurality of the first conditions; the radio base station settles a state of transmission OFF when the condition is not the compressed mode GAP, settles a state for increasing or decreasing the transmission power value as a first amount when the condition is RPP section, and settles a state for increasing or decreasing the transmission power value as a second amount less than the first amount when the condition is not RPP section.

6. The base band transmitter/receiver according to claim 1, wherein the radio base station is for CDMA, and performs spread modulation by using a spreading code of each call.

7. The base band transmitter/receiver according to claim 2, wherein the radio base station is for CDMA, and performs spread modulation by using a spreading code of each call.

8. The base band transmitter/receiver according to claim 3, wherein the radio base station is for CDMA, and performs spread modulation by using a spreading code of each call.

9. The base band transmitter/receiver according to claim 4, wherein the radio base station is for CDMA, and performs spread modulation by using a spreading code of each call.

10. The base band transmitter/receiver according to claim 5, wherein the radio base station is for CDMA, and performs spread modulation by using a spreading code of each call.

11. A method of controlling a base band transmitter/receiver in a radio base station that transmits transmission data including a first power control command so that reception quality of signals from a mobile terminal is constant and adjusts transmission power on a basis of a second power control command in reception data from the mobile terminal, comprising:
   measuring the quality of a reception signal by a quality measurer;
   settling a state judged from a plurality of states corresponding to a plurality of first conditions which determines the first power control command to be inserted into transmission data, and for determining the first power control command on a basis of the measured quality of the reception signal and the state for settling by a power control command determiner;
   detecting and judging the second power control command from the reception data by a detecter/judge;
   settling a state judged from a plurality of states corresponding to a plurality of second conditions which determines the transmission power for a call, and for determining a transmission power value for the call concerned on a basis of the judged second power control command and the state for settling by a power determiner;
   primary modulating a frame generated by inserting a pilot symbol for synchronous detection and a dummy power control command into the transmission data for one slot period by a first modulator;
   subjecting the primary modulated frame to secondary modulation by using a code of each call for multiplexing by a second modulator; and
   being inputted a timing information of the symbol where the dummy power control command is inserted to and the transmission data in the secondary modulated frame modulated by the second modulator, multiplying the transmission data by the determined transmission power value, inverting the symbol on a basis of the determined first power control command at a timing of the dummy power control command indicated by the timing information, and outputting the inverted symbol in real time by a power setting part.

12. The method of controlling the base band transmitter/receiver according to claim 11, wherein the determination of the power control command in the power control command determiner and the determination of the transmission power value in the power determiner are carried out at a timing of each call, the generated frame is synchronized on all calls under the control of the base station, and the inverting symbol processing is carried out at the same timing for all calls.

13. The method of controlling the base band transmitter/receiver according to claim 11, wherein the first power control command is a binary information which indicates "up" or "down", is mapped either one of two symbols located origin symmetrically in QPSK modulation at the first modulator, and the power setter inverts the symbol by inverting the sign of the transmission power value which is multiplied by the transmission data at a timing of the dummy power control command.

14. The method of controlling the base band transmitter/receiver according to claim 11, wherein the plurality of the first conditions includes at least conditions relating to a frame synchronization and alternate variation timing, as the plurality of states corresponding to the plurality of the second conditions, the power control command determiner settles a state which determines ordinarily the first power control command on the basis of the measured quality of the reception signal when the condition is frame synchronizing, and settles a state for inverting the first power control command in previous information or settles a state for determining the power control command as "up" corresponding to the condition of the alternate variation timing when the condition is not frame synchronizing.

15. The method of controlling the base band transmitter/receiver according to claim 11, wherein the plurality of the second conditions includes at least conditions relating to compressed mode GAP, RPP section and power amplification, as the plurality of states corresponding to the plurality of the first conditions, the power determiner settles a state of transmission OFF when the condition is not the compressed mode GAP, settles a state for increasing or decreasing the transmission power value as a first amount when the condition is RPP section, and settles a state for increasing or decreasing the transmission power value as a second amount less than the first amount when the condition is not RPP section.

16. The method of controlling the base band transmitter/receiver according to claim 11, wherein the radio base station is for CDMA, and the second modulator performs spread modulation by using a spreading code of each call.

17. The method of controlling the base band transmitter/receiver according to claim 12, wherein the radio base station is for CDMA, and the second modulator performs spread modulation by using a spreading code of each call.

18. The method of controlling the base band transmitter/receiver according to claim 13, wherein the radio base station is for CDMA, and the second modulator performs spread modulation by using a spreading code of each call.

19. The method of controlling the base band transmitter/receiver according to claim 14, wherein the radio base station is for CDMA, and the second modulator performs spread modulation by using a spreading code of each call.

20. The method of controlling the base band transmitter/receiver according to claim 15, wherein the radio base station is for CDMA, and the second modulator performs spread modulation by using a spreading code of each call.

\* \* \* \* \*